324-77 SR 05-25-71 XR 3,581,078

[11] 3,581,078

[72] Inventor George H. Robertson
Summit, N.J.

[21] Appl. No. 685,648
[22] Filed Nov. 24, 1967
[45] Patented May 25, 1971
[73] Assignee Bell Telephone Laboratories, Incorporated
Murray Hill, N.J.

[54] FAST FOURIER ANALYZER

10 Claims, 4 Drawing Figs.

[52] U.S. Cl. .......... 235/193, 324/77, 235/181
[51] Int. Cl. .......... G06g 7/19, G01r 23/16
[50] Field of Search .......... 235/193, 184, 181; 324/77 G, 77 C; 340/15.5 C; 179/15

[56] References Cited

UNITED STATES PATENTS

| | | | |
|---|---|---|---|
| 3,087,674 | 4/1963 | Cunningham et al. ........ | 235/193X |
| 3,162,808 | 12/1964 | Haase .......... | 235/193 |
| 3,209,250 | 9/1965 | Burns et al. .......... | 324/77(G) |
| 3,431,405 | 3/1969 | Dawson .......... | 235/181X |

*Primary Examiner*—Eugene G. Botz
*Assistant Examiner*—Joseph F. Ruggiero
*Attorneys*—R. J. Guenther and William L. Keefauver

ABSTRACT: The recursive equations of the Cooley-Tukey algorithm are implemented in analog form, thereby significantly decreasing the time needed to compute either the Fourier transform or the inverse Fourier transform of a signal segment, relative to the time needed for the same computation by a digital implementation of these equations.

INVENTOR
G. H. ROBERTSON
BY
A. H. MacPherson
ATTORNEY

FAST FOURIER ANALYZER

BACKGROUND OF THE INVENTION

This invention relates to data processing and, in particular, to the derivation of the amplitudes and phases of the harmonically-related frequency components representing a finite number of samples derived from a selected signal. Additionally, this invention relates to the derivation of the complex Fourier series representation of a selected signal segment from the amplitudes and phases of the harmonically-related frequency components constituting this series.

James W. Cooley and John W. Tukey, in an article entitled "An Algorithm for the Machine Calculation of Complex Fourier Series," published Apr. 1965 in the *Mathematics of Computation*, Vol. 19, page 297, describe a technique adaptable to the rapid calculation of the amplitudes and phases of the harmonically related frequency components representing samples derived from a segment of a band-limited signal. This technique, known as the "Cooley-Tukey algorithm" allows the calculation of these amplitudes and phases—the so-called complex Fourier series coefficients—in a very short time compared to the time required using classical computational techniques. In fact, the Cooley-Tukey algorithm makes feasible the computation of these coefficients in real time with a digital computer.

Several special purpose digital computers have been proposed to take advantage of the Cooley-Tukey algorithm. For example, Pat. application Ser. No. 605,791, filed Dec. 29, 1966, by G. D. Bergland and R. Klahn, and assigned to Bell Telephone Laboratories, Inc., assignee of this invention, and Pat. application Ser. No. 667,113, filed Sept. 12, 1967 by W. M. Gentleman and also assigned to Bell Telephone Laboratories, Inc., both disclose special digital computation methods and apparatus for performing the operations required by this algorithm.

SUMMARY OF THE INVENTION

This invention provides another implementation of the Cooley-Tukey algorithm. However, rather than carry out digitally the operations required by this algorithm, as does the prior art, this invention, surprisingly, carries out these operations in analog form. As a result, no complex digital computers, per se, are required. Rather, according to this invention, apparatus is constructed so that the operations required by this algorithm are inherent in the structure of the apparatus. Using the analog apparatus of this invention, either the complex Fourier series coefficients of a set of samples derived from a signal, or the inverse Fourier transform of these samples, can be obtained in an extremely short time—a time much shorter in fact than the time required to obtain these data digitally.

According to this invention, the samples to be processed, derived from a selected signal segment, are stored in sequence. A complex sinusoid, whose frequency determines the time necessary to generate either the amplitudes and phases of the frequency components representing the stored samples, or the discrete values of the Fourier series representation of these samples, is sent along paths equal in number to the number of stored samples. The sinusoid in each path is amplitude modulated, or, if the stored samples are complex samples representing both amplitude and phase, both amplitude and phase modulated, by the corresponding stored sample.

Now, the Cooley-Tukey algorithm is based on a set of recurring or "recursive" equations. The first recursive equation describes how each of a set of samples—either real or complex, depending on whether a Fourier transform or an inverse Fourier transform is being calculated—is to be operated upon and combined to yield a first set of new data. This first set of data in turn is operated upon as required by a second recursive equation. A second set of data produced by the operations required by the second recursive equation, in turn, is operated upon in a manner described by a third recursive equation. The number of recursive equations in the set depends on the number of samples to be processed. For example, if the number of samples $N$ equals $r^m$, $r$ and $m$ both being integers, $m$ recursive equations exist, and $m$ sets of recursive operations must be carried out. In calculating the Fourier transform of a set of samples using the Cooley-Tukey algorithm, the final set of recursive operations yields the amplitudes and phases of the harmonically-related frequency components representing the samples. Alternatively, in calculating the inverse Fourier transform, the final set of recursive operations yields the Fourier series representation of the processed samples.

Thus, after the sinusoid on each path has been modulated by the sample corresponding to the path, the resulting modulated sinusoids, representing the samples, are processed and selectively combined as required by the first recursive equation to produce a first set of processed sinusoids. This first set of processed sinusoids is then processed and selectively combined as required by the second recursive equation of the Cooley-Tukey algorithm to produce a second set of processed sinusoids. This second set of sinusoids represents the information to be processed and selectively combined as required by the third recursive equation of the algorithm. The processing and combining of sets of sinusoids is repeated $m$ times, the final set of processed sinusoids representing—when the Fourier transform is being calculated—the amplitudes and phases of the harmonically related frequency components of the stored samples.

For the number of samples $N=2^m$, $m$ an integer, the processing and combining of the sets of sinusoids in each recursive operation required by the Cooley-Tukey algorithm consists of two steps: first, either delaying or phase-shifting individual sinusoids by specified amounts, and second, adding selected pairs of sinusoids. As a special feature of this invention, phase-shifting of the sinusoids is carried out with minimum delay in special phase-shifting networks.

THEORY

Figure 1:
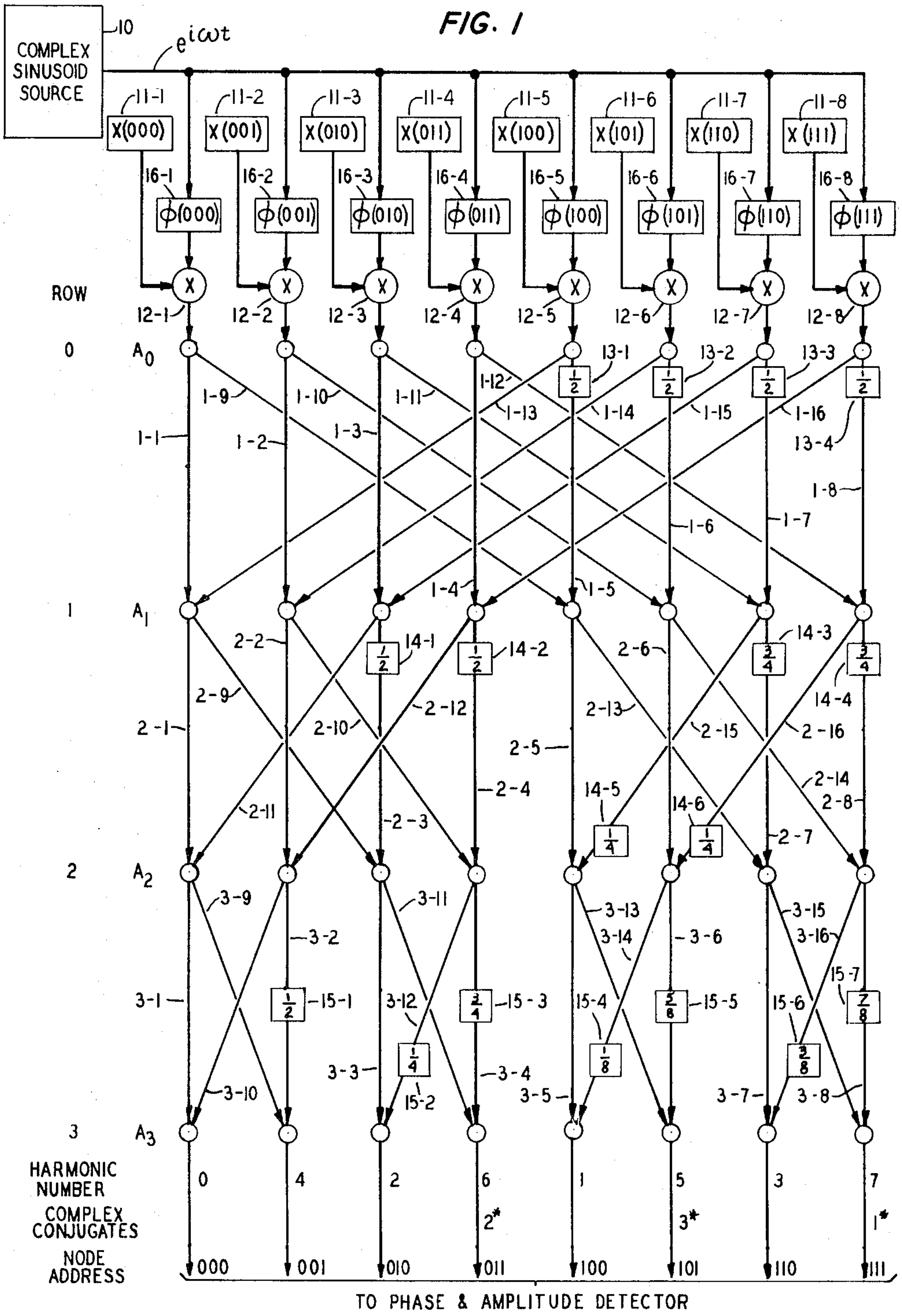
FIG. 1 is a schematic block diagram of an analog network for carrying out this invention when the number of samples $N=2^m$, $m$ being an integer.

The Cooley-Tukey algorithm is an efficient method for computing both the so-called "discrete Fourier transform" or "DFT" and the "inverse discrete Fourier transform" or "IDFT." While the theory and operation of this invention will be described in terms of the DFT, it should be understood that this invention will also carry out the IDFT.

The DFT is defined as $$A(j)=\frac{1}{N}\sum_{k=0}^{N-1}X(k)e^{\frac{-2\pi ijk}{N}} \quad (1)$$

$A$ represents the $j^{th}$ complex frequency of the set of $N$ samples $X(0),...,XBY(k),...,X(N-1)$, and $i=\sqrt{-1}$.

In Equation (1), both $j$ and $k$ are indices denoting, respectively, the particular complex frequency component of the DFT being derived from the set of $N$ samples, and the particular sample in this set. Both $j$ and $k$ have a maximum value $(N-1)$.

Now, in Equation (1), the exponential term, written for convenience as $\exp(-2\pi ijk/N)$, is a function of the product $jk$. Because both $j$ and $k$ have a maximum value $(N-1)$ the maximum value of this exponential is $\exp(-2\pi iN^2/N)$. In other words, $\exp[-2\pi bi(N-1)^2/N]$, a complex number with unity amplitude and phase proportional to $jk$, has a maximum phase of approximately $(N-2)$ cycles for large $N$. Thus, in computing the value of the series on the right-hand side of Equation (1) for a particular value of $j$, $\exp(-2\pi/N)$ passes repetitively through identical numerical values as its phase increases by one cycle increments. The Cooley-Tukey algorithm essentially reduces this redundancy to increase the speed with which the DFT can be computed.

To derive the recursive equations of the Cooley-Tukey algorithm for the special case where $N=2^m$, $m$ being an integer, one defines the indices $k$ and $j$ as follows:

$$k=k_{m11}2^{m11}+k_{m12}2^{m12}+\ldots+k_0 \qquad (2)$$

and $$j=j_{m11}2^{m11}+j_{m12}2^{m12}+\ldots+j_0 \qquad (2a)$$

These equations represent the binary expansions of $j$ and $k$. Both $k_p$ and $j_p$ (where $p=m-1$, $m-2$,...,0) assume values of either 0 or 1, depending upon the particular value of $k$ or $j$ specified. Similar equations can be derived for the case where $N=r^m$, $r$ being an integer, or for $$N=\prod_{i=1}^{m} r_i,$$

the $r_i$'s being integers and "$\Pi$" meaning "product."

Substituting Equations (2) and (2$a$) into Equation (1) produces the following equation:

$$A(j_0 \ldots j_{m-1})=\frac{1}{N}\sum_{k_0=0}^{1}\cdots\sum_{k_{m-2}=0}^{1}\left[\sum_{k_{m-1}=0}^{1} X(k_{m-1}\ldots k_0)W^{jk_{m-1}2^{m-1}}\right]\times W^{j(k_{m-2}2^{m-2}+\ldots+k_0)} \qquad (3)$$

where, for convenience, $e^{-2\pi i/N}=W$. Letting $X(k_{m11},\ldots,k_0)$ become $X_0(k_{m11},\ldots,k_0)$, where the subscript $0$ denotes that the term $X_0(k_{m11},\ldots,k_0)$ represents the first set of data to be processed—that is, the signal samples (or in this invention, complex sinusoids representing the signal samples)—the term in brackets can be written as $$\sum_{k_{m-1}=0}^{1} X_0(k_{m-1}\ldots k_0)W^{jk_{m-1}2^{m-1}} = \sum_{k_{m-1}=0}^{1} X_0(k_{m-1}\ldots k_0)W^{j_0k_{m-1}2^{m-1}} \qquad (4)$$

because $$e^{-2\pi i[j_{m-1}2^{m-1}+\ldots+j_12]k_{m-1}2^{-1}}=1 \qquad (5)$$

Equivalently, Equation (4) can be written as $$X_1(j_0, k_{m-2}\ldots k_0) = X_0(0, k_{m-2}\ldots k_0)W^0+X_0(1, k_{m-2}\ldots k_0)W^{j_02^{m-1}} \qquad (6)$$

Equation (6) is the first recursive equation for carrying out the Cooley-Tukey algorithm. Substituting Equation (6) into Equation (6) yields $$A(j_0 \ldots j_{m-1})=\frac{1}{N}\sum_{k_0=0}^{1}\cdots\left[\sum_{k_{m-2}=0}^{1} X_1(j_0, k_{m-2}\ldots k_0)W^{jk_{m-2}2^{m-2}}\right]W^{j(k_{m-3}2^{m-3}\ldots k_0)} \qquad (7)$$

Operating on the bracketed term in Equation (7) in the same manner as on the bracketed term in Equation (3), one obtains the second recursive equation $$X_2(j_0, j_1, k_{m-3}\ldots k_0)=X_1(j_0, 0, k_{m-3}\ldots k_0)W^0 + X_1(j_0, 1, k_{m-3}\ldots k_0)W^{(j_12+j_0)2^{m-2}} \qquad (8)$$

The operations described above are repeated until no further summations remain on the right-hand side of Equation (3).

Equations (6) and (8) are the first two recursive equations in the set of recursive equations defining the operations to be carried out, according to the Cooley-Tukey algorithm, to obtain the DFT defined in Equation (1). From recursive Equations (6) and (8), the following expression is written for the general recursive equation in the algorithm:

$$X_p(j_0 \ldots j_{p-1}, k_{m-p-1}\ldots k_0)=\sum_{k_{m-p}=0}^{1} X_{p-1}(j_0\ldots j_{p-2}, k_{m-p}\ldots k_0)W^{(j_{p-1}2^{p-1}+\ldots+j_0)k_{m-p}2^{m-p}} \qquad (9)$$

The number of such recursive equations in the algorithm depends upon $m$ which, in turn, equals $\log_2 N$. For the case where $m=3$, three recursive equations are necessary and sufficient to calculate the DFT.

In implementing the Cooley-Tukey algorithm for $m=3$, first, Equation (6) is applied to the $N=2^3$ or eight signal samples $X_0(000)$ through $X_0(111)$ to yield a first set of new data $X_1(000)$ through $X_1(111)$. Then Equation (8), the second recursive equation of the algorithm, is applied to $X_1(000)$ through $X_1(111)$ to produce a second set of new data $X_2(000)$ through $X_2(111)$. Finally, Equation (9), with $p=3$, is applied to $X_2(000)$ through $X_2(111)$ to produce a third and final set of data $X_3(000)$ through $X_3(111)$ representing the amplitudes and phases of the harmonically related frequency components of the signal samples $X_0(000)$ through $X_0(111)$.

DETAILED DESCRIPTION

FIG. 1 shows one embodiment of this invention. The apparatus shown in FIG. 1 is essentially an analog computer for producing output signals representing either the amplitudes and initial phases of the harmonically related frequency components derived from eight consecutive samples of a signal, or the complex Fourier series of these signals. The principles of this invention can, of course, be used to process greater numbers of samples.

To obtain the amplitudes and phases of the Fourier harmonics representing a signal segment, storage units 11-1 through 11-8 contain, respectively, eight discrete samples $X(000)$ through $X(111)$ derived from the selected signal segment. Since, as to be described, these discrete samples are utilized in analog form, storage units 11-1 through 11-8 are understood to contain digital-to-analog converters of the kind well-known to those skilled in the art. Delays 16-1 through 16-8, which store the phase component of the complex Fourier coefficients when this apparatus is used to generate the inverse discrete Fourier transform, are set equal to zero. A complex sinusoid $e^{i\omega t}$, with frequency $\omega$ in radians per second, from source 10, is sent simultaneously to multipliers 12-1 through 12-8. Each multiplier 12 produces an output signal proportional to the product of the sample stored in the corresponding storage unit 11 and the sinusoid. These amplitude-modulated sinusoids, eight in all, represent the eight signal samples and are denoted $X_0(000)$ through $X_0(111)$. As required by recursive Equation (6), eight pieces of new data, $X_1(000)$ through $X_1(111)$, are produced from these eight sinusoids. It should be understood that hereafter, unless stated otherwise, whenever data is referred to as $X_0(—)$, $X_1(—)$, $X_2(—)$, or $X_3(—)$, these symbols represent the product of a complex sinusoid and an amplitude.

Thus, the first piece of new data $X_1(000)$ is a sinusoid composed of the sum of $X_0(000)$ and $X_0(100)$, sinusoids representing the first and the fifth signal samples. The second piece of data $X_1(001)$, likewise a sinusoid, equals, as shown by replacing the arguments of the terms on the right-hand side of Equation (6) by their proper binary values, the sum of $X_0(001)$ and $X_0(101)$, sinusoids representing the second and the sixth signal samples. The third and fourth pieces of data, $X_1(010)$ and $X_1(011)$, are similarly produced from sinusoids representing the third and seventh, and the fourth and eighth, signal samples, respectively.

The fifth piece of data $X_1(100)$ equals, according to Equation (6), $X_0(000)+X_0(100)W^2$. But $W$ equals $\exp(-2\pi i/2^m)$. Therefore $$X_1(100)=X_0(000)+X_0(100)e^{-\pi}i, \qquad (10)$$

and the fifth piece of data produced by recursive Equation (6) is composed of the sum of the sinusoid representing the first signal sample $X_0(000)$, plus the sinusoid representing the fifth signal sample $X_0(100)$ delayed by one-half cycle. Recursive Equation (6), likewise, shows that the sixth piece of data $X_1(101)$ is composed of the sum of the sinusoid representing the second signal sample $X_0(001)$ plus the sinusoid representing the sixth signal sample $X_0(101)$, likewise delayed by one-half cycle. The seventh and eighth pieces of data required by Equation (6) are produced from specified pairs of sinusoids in a similar manner. As stated earlier, all these pieces of data are, in this invention, represented as sinusoids.

In FIG. 1, conducting paths with arrowheads 1–1 through 1–16, leading from the circuit nodes in "row 0" to the circuit nodes in "row 1" show schematically the operations required by recursive Equation (6). Delays 13–1 through 13–4, placed, respectively, in paths 1–5 through 1–8, indicate that the sinusoids transmitted on paths 1–5 through 1–8 are each delayed by one-half cycle, as required by recursive Equation (6).

Equation (8), the second recursive equation, describes the operations to be carried out on the sinusoids, or data, $X_1(000)$ through $X_1(111)$ produced by the first recursive operation. As shown by Equation (8), the first new sinusoid $X_2(000)$ equals the sum of $X_1(000)$ plus $X_1(010)$, both old sinusoids produced by the first recursive operation. The third sinusoid $X_2(010)$ produced by the second recursive operation, equals $X_1(000)+X_1()W^{2^2}$. Thus, $$X_2(010)=X_1(000)+X_1(010)\,e^{-\pi i}, \qquad (11)$$

and the third sinusoid $X_2(010)$ produced by the second recursive operation equals the sum of the first and the third sinusoids produced by the first recursive operation, the third sinusoid being delayed by one-half cycle. The second and fourth through eighth sinusoids produced by the second recursive operation are similarly derived by use of recursive Equation (8).

The operations required on the eight sinusoids $X_1$produced by the first recursive operation to produce eight sinusoids $X_2$in the second recursive operation, together with the delays required by recursive Equation (8), are shown by paths 2–1 through 2–16 together with delays 14–1 through 14–6, linking row 1 to row 2.

The third and final recursive operation described by substituting $p=3$ and $m=3$ in Equation (9), the general recursive equation, is carried out in a fashion identical to the operations described above for the first and second recursive operations and thus will not be described in detail. However, the operations required by Equation (9) are again shown schematically in FIG. 1 by paths 3–1 through 3–16, with delays 15–1 through 15–7, connecting row 2 to Because $m=3$, only three recursive operations are required. Thus, the complex sinusoids appearing at the nodes in row 3 represent the desired amplitudes and phases of the first four harmonically related frequency components representing the eight signal samples $X(000)$ through $X(111)$ stored in units 11–1 through 11–8.

It should be noted that although there are eight nodes in row 3, nodes 011, 101 and 111, row 3, produce output signals which represent the complex conjugates of the second, third and first harmonics, respectively. This occurs as a result of the phenomenon called "aliasing," fully described by Blackman and Tukey in a book entitled "*The Measurement of Power Spectra - From the Point of View of Communications Engineering*," published by Dover Publications, Inc., 1958.

Figure 3:
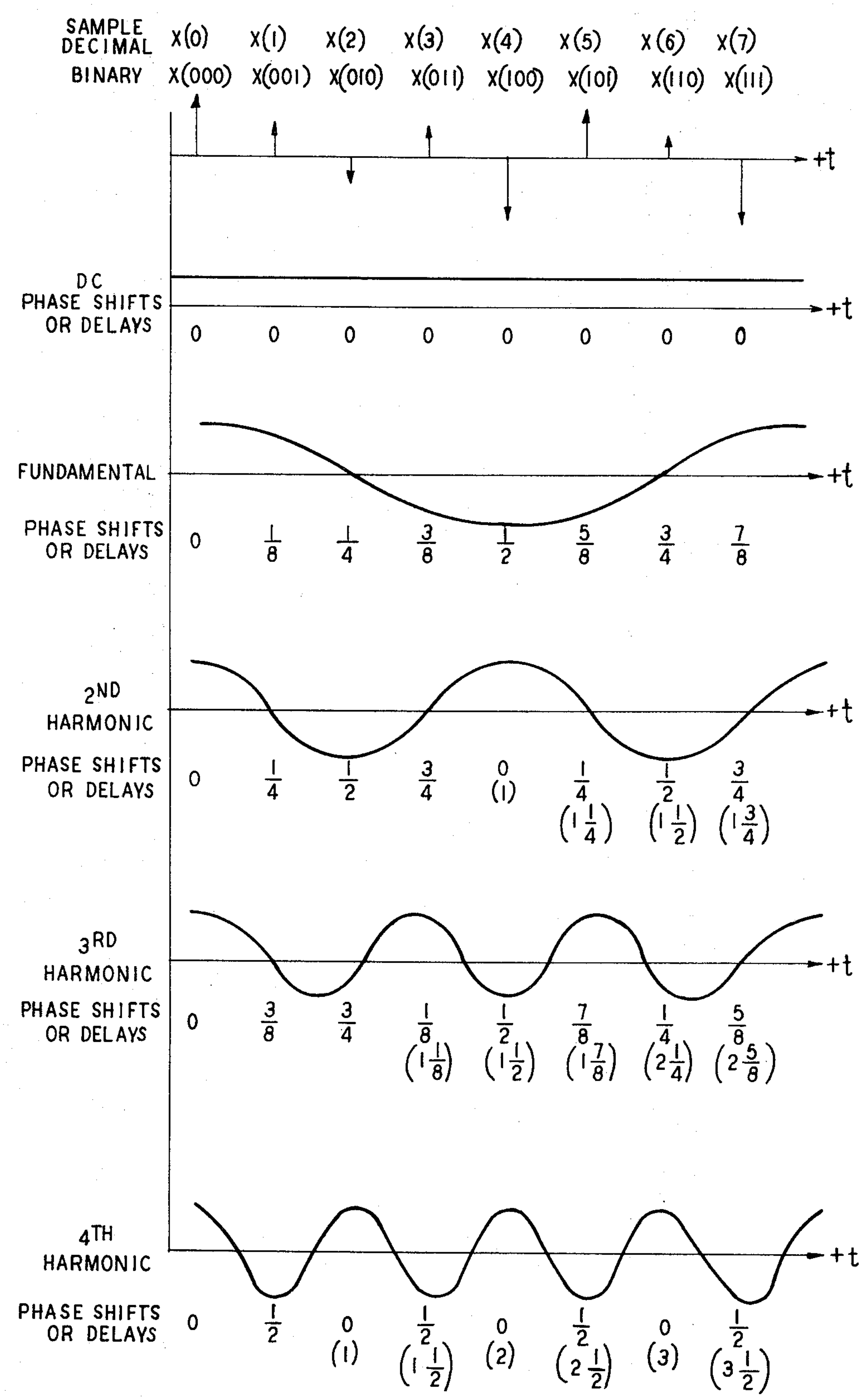
FIG. 3 is a schematic diagram of assistance in understanding the operation of the analog network shown in FIG. 1.

FIG. 3 shows a schematic diagram for aid in understanding the operation of the apparatus shown in FIG. 1. Across the top of the figure are listed the sample numbers in both decimal and binary notation. Directly beneath this listing is shown a hypothetical set of eight samples represented by arrows arbitrarily pointing up or down.

The DFT contains a DC component plus a fundamental frequency inversely proportional to the length of the signal segment from which the samples $X(0)$ through $X(N-1)$ are derived, together with harmonics of this fundamental frequency. From $N$ samples only $N$ pieces of information, the amplitudes and phases of $N/2$ frequency components not including the DC value, can be defined.

As is well known, the DC component of a signal is obtained merely by summing the samples of the signal. An examination of FIG. 1 shows that the output signal from the node in row 3 at address "000," directly above the harmonic number labeled "0," is precisely this DC component. Thus, the sinusoid modulated by the first sample $X(000)$ passes undelayed from node 000, row 0 to node 000, row 3. The sinusoid modulated by the second sample $X(001)$, likewise passes undelayed from node 001, row 0, to node 000 of row 3. Indeed, the sinusoids modulated by samples $X(010)$ through $X(111)$ all pass undelayed from their respective nodes in row 0 to node 000 of row 3. Thus, at any instant the amplitude of the sinusoid at node 000, in row 3, represents the DC component of the stored samples.

FIG. 3 shows a hypothetical DC component derived from the stored samples. Directly beneath this DC component, and vertically below each sample at the top of the figure, are the relative delays imposed on the sinusoids modulated by the samples before the modulated sinusoids are summed to produce the DC component. These delays are, as discussed above, zero.

The fundamental frequency of the samples $X(000)$ through $X(111)$ by definition completes one cycle over the period represented by the stored samples. To produce an estimate of the amplitude and phase of this fundamental, each stored sample must be multiplied by the real and imaginary values of one cycle of the complex sinusoid at a time corresponding to the sample. A single cycle of the fundamental, arbitrarily oriented with respect to phase, is shown in FIG. 3. To obtain an estimate of the amplitude and phase of the fundamental, this figure shows that each sample must be multiplied by the complex sinusoid advanced by one-eighth cycle more in phase than it was when it multiplied the preceding sample.

An examination of FIG. 1 shows that node 100, row 3, is the node at which the signal representing the fundamental frequency appears. This signal, the sum of eight modulated, incrementally delayed sinusoids, has an amplitude proportional to the amplitude of the fundamental frequency, and a phase, relative to the phase of the sum signal representing the DC component, proportional to the initial phase of the fundamental frequency.

In FIG. 1, however, it should be noted that each modulated sinusoid leaving row 1 is delayed one-eighth cycle more than the sinusoid modulated by the preceding sample —rather than advanced by one-eighth cycle —before arriving at node 100, row 3. This was done for ease of implementation. But as a result, the sign of the phase information in the signal at node 100, row 3, as well as at all the other nodes in row 3, is reversed relative to what it would be if phase advances were used.

Thus, in FIG. 1, $X_0(000)$, the sinusoid modulated by the first sample $X(000)$, is passed directly to node 100, row 3. $X_0(001)$, the sinusoid modulated by the second sample $X(001)$, is delayed one-eighth cycle in delay 15–4 before it reaches node 100 in row 3. The sinusoid modulating the third sample, in turn, is delayed one-fourth cycle by delay 14–5 before it reaches this node. The fourth through eighth modulated sinusoids likewise each arrive at node 100, row 3, progressively one-eighth cycle later than the sinusoids modulating the preceding samples. Thus, the signal at node 100, row 3, represents the amplitude and phase of the fundamental frequency of the stored samples.

It is apparent from FIG. 3 that to produce a composite signal with an amplitude proportional to the amplitude of the second harmonic of the stored signals, each modulated sinusoid must be adjusted one-fourth cycle relative to the sinusoid modulated by the preceding sample. An analysis of the paths followed by the sine waves arriving at node 010, row 3 (FIG. 1), shows that this is indeed the case. Each sinusoid arrives one-fourth cycle out of phase with the sinusoids modulated by adjacent samples.

Likewise, the sinusoids summed to produce the third harmonic must be added three-eighths of a cycle out of phase to produce a composite signal at node 110, row 3, representing the amplitude and phase of the third harmonic.

The composite signal representing the fourth harmonic is derived by adding sinusoids arriving at node 001, row 3 (FIG. 1), one-half cycle out of phase.

The initial phases of each harmonic are determined by comparing the phases of the signals representing the harmonics at the nodes in row 3, with the phase of the sinusoid at node 000, row 3, representing the DC component. The phase difference between the composite signal representing a particular harmonic and the composite signal representing the DC component equals the initial phase of the corresponding harmonic.

A phase comparator for producing these initial phases comprises a multiplier, which forms the product signal $\cos[2\omega t+\Phi(-AH—)+\Phi(000)]\cos\Delta\Phi$ from the real parts of the composite signals representing a particular harmonic and the DC component, a low-pass filter for producing an output signal representing $\cos\Delta\Phi$ where $\Delta\Phi=\Phi(—)-\Phi(000)$ is the desired phase difference, and a nonlinear network for deriving a signal representing $\Delta\Phi$ from the signal representing $\cos\Delta\Phi$. This phase comparator is well known and thus will not be shown in detail.

The amplitude of a particular harmonic can be derived by rectifying and low-pass filtering the corresponding complex sinusoid, or more rapidly, by squaring and summing two quadrature samples derived from the sinusoid.

In the preceding description of the apparatus shown by FIG. 1, the phase shifts required by recursive Equations (6), (8) and (9) were achieved with delays. Equivalently, these phase shifts can be achieved by use of a dual-purpose, phase-shifting and combining circuit at each node.

As shown in FIG. 1, source 10 produces a complex sinusoid $e^{j\omega t}$. By definition, $$e^{j\omega t}=\cos\omega t+i\sin\omega t, \qquad (12)$$

and thus the complex sinusoid is composed of two signals, one $\cos\omega t$ and the other $\sin\omega t$. Source 10 produces these two signals.

If each sample being modulated by the complex sinusoid possesses, in general, amplitude $X$—) *and phase* $\Phi$—), *the phase information is used to control units 16—1 through 16—8, these units being either delays or phase shifters. The signals* $\cos\omega t$ and $\sin\omega t$, upon being passed through unit 16-1, for example, become $\cos[\omega t-\Phi(000)]$ and $\sin[\omega t-\Phi(000)]$. Upon being amplitude modulated by $X(000)$, these signals become $X(000)\cos[\omega t-\Phi(000)$ and $X(000)\sin[\omega t-(000)]$.

Now in FIG. 1, node 100, row 1, for example, receives data both on path 1-9 from node 000, row 0, and on path 1-5 from node 100, row 0. The data from node 100 in row 0 must be phase-shifted by one-half sinusoid cycle before being combined at node 100, row 1, with the data from node 000. The apparatus shown in FIG. 2 does this.

Figure 2:
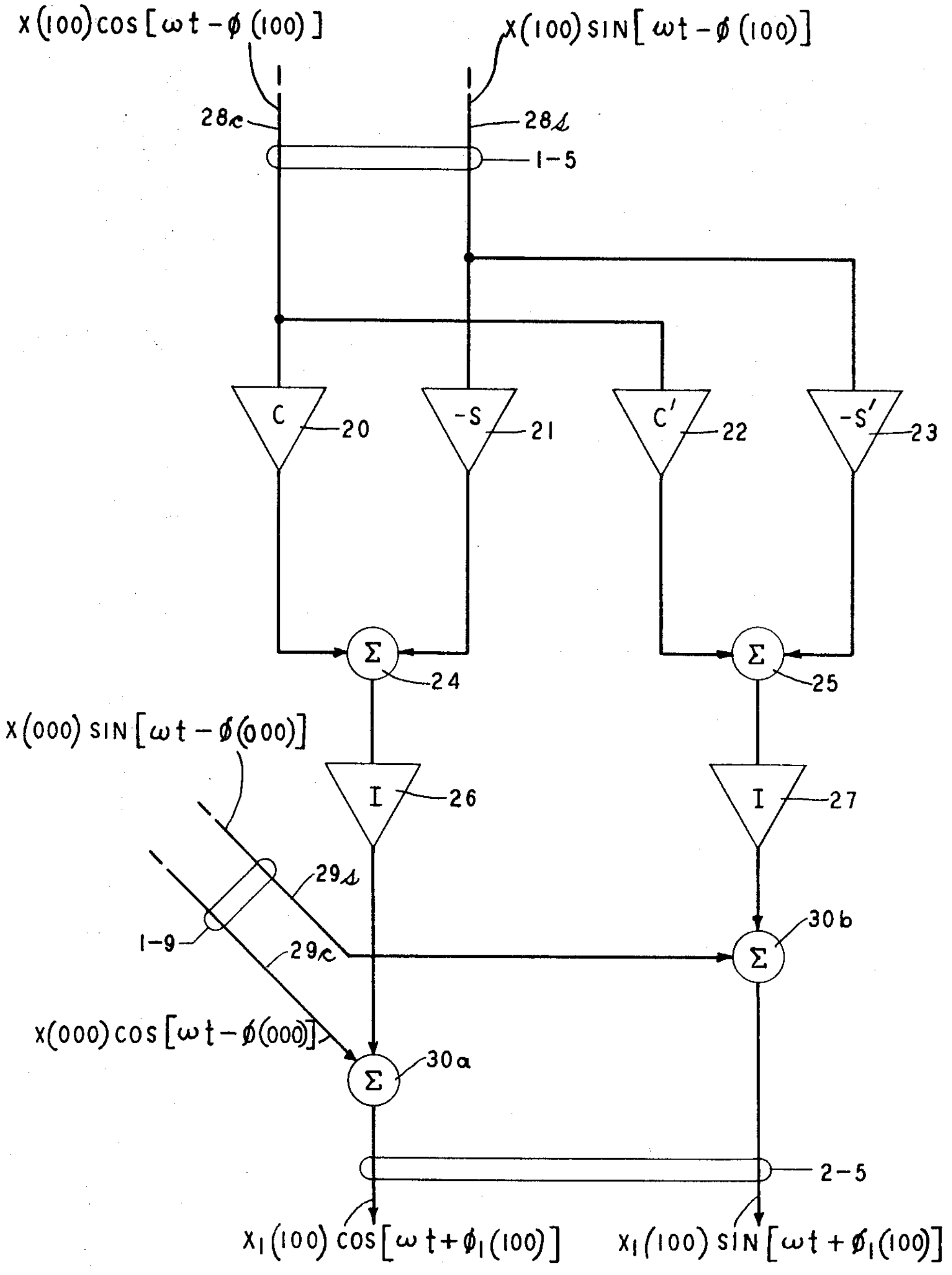
FIG. 2 is a phase-shifting network useful in the embodiment of FIG. 1.

As shown in FIG. 2, conducting path 1-5 comprises cosine lead 28c which carries the signal $X(100)\cos[\omega t-\Phi(100)]$ and sine lead 28s which carries the signal $X(100)\sin[\omega t-\Phi(100)]$. According to the version of recursive Equation (6) applying to node 100, row 1, the phase of these two signals must be decreased by $\pi$ radians relative to the phases of the complex sinusoid from source 10. Thus, these two signals must become $X(100)\cos[\omega t-\Phi(100)-]$ and $X(100)\sin[\omega t-\Phi(100)-]$, respectively. This is done by making use of the relations $$CX(100)\cos[\omega t-\phi(100)]-SX(100)\sin[\omega t-\phi(100)]=\sqrt{C^2+S^2}X(100)\cos[\omega t-\phi(100)+\alpha] \qquad (13)$$

and $$C'X(100)\cos[\omega t-\phi(100)]-S'X(100)\sin[\omega t-\phi(100)]=\sqrt{(C')^2+(S')^2}X(100)\cos\left[\omega t-\phi(100)+\alpha-\frac{\pi}{2}\right]=\sqrt{(C')^2+(S')^2}X(100)\sin[\omega t-\phi(100)+\alpha] \qquad (14)$$

where the gains C and S, and C′ and S′ are such that $$C^2+S^2=1 \qquad (15a)$$

$$(C')^2+(S')^2=1 \qquad (15b)$$

$$\alpha=\tan^{-1}\frac{S}{C} \qquad (16a)$$

$$\alpha-\frac{\pi}{2}=\tan^{-1}\frac{S'}{C'} \qquad (16b)$$

These gains ensure that the phase-shifted signals do not change in amplitude. At node 100, row 1, $\alpha=-\pi$, the equivalent of one-half cycle of $\omega$. Solving Equations (15*a*), (15*b*), (16*a*) and (16*b*), yields solutions for the gains in Equations (13) and (14) of $S=0$, $C=-1$, $S'=1$, and $C'=0$. This in FIG. 2 the cosine signal on lead 28c is sent to amplifiers 20 and 22, with gains $C$ and $C'$, respectively. The sine signal on lead 28s is sent to amplifiers 21 and 23 with gains $-S$ and $-S'$, respectively. Summing network 24 adds the output signals from amplifiers 20 and 21 to produce the phase-shifted cosine signal on the right-hand side of Equation (13). Summing network 25 adds the output signals from amplifiers 22 and 23 to produce the phase-shifted sine signal on the right-hand side of Equation (14).

The cosine signal from network 24 is passed through isolation amplifier 26 and then combined at summing network 30*a* with the cosine signal $X(000)\cos[\omega t-\Phi(000)]$ received on lead 29*c* from node 000, row 0. The sine signal from network 27 is similarly passed through isolation amplifier 27 and then combined at summing network 30*b* with the sine signal $X(000)\sin[\omega t-\Phi(000)]$ received on lead 29*s* from node 000, row 0. The resulting composite cosine and sine signals $X_1(100)\cos[\omega a E\Phi_1(100)]$ and $X_1(100)\sin[\omega t-\Phi_1(100)]$, respectively, represent together one piece of complex data -

$$X_1(100)e^{i[\omega t-\phi_1(100)]}$$

- to be operated on in the second recursive operation.

Phase-shifting and combining networks similar to the one shown in FIG. 2 can be used for each delaying and combining operation required in the apparatus of FIG. 1. When this is done, the time delay in obtaining useful output signals from this apparatus is just the time necessary to carry out the amplification and combining operations in series at three nodes. This time can be made much shorter than 1 cycle of the sinusoid from source 10 (which might have a frequency of 1 MHz, for example), and thus can be neglected. Obviously, the apparatus shown in FIG. 1 can yield the amplitudes and phases of the Fourier series coefficients very rapidly —at most in just a few cycles of the complex sinusoid $e^{j\omega t}$ from source 10.

Figure 4:
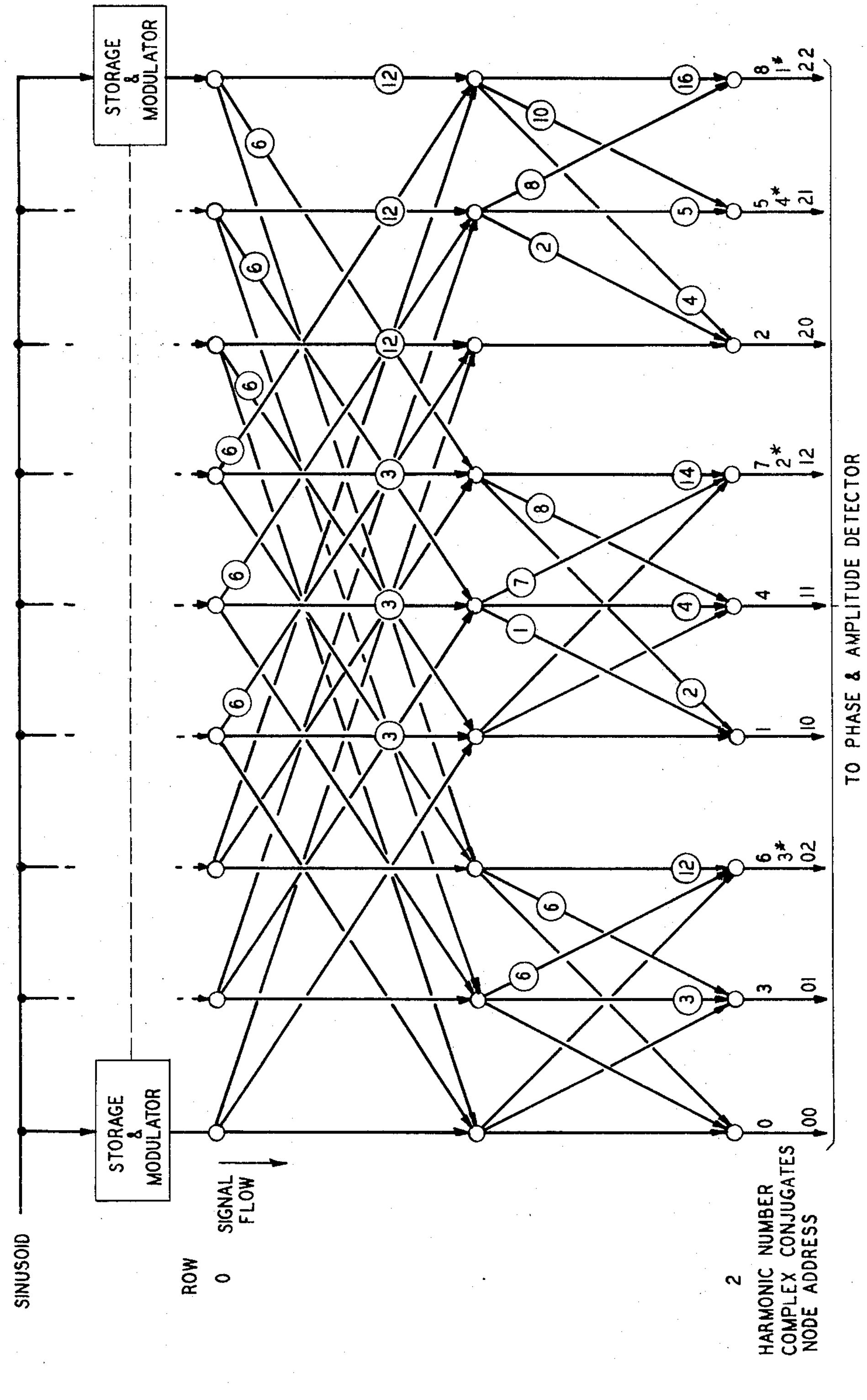
FIG. 4 is a schematic block diagram of the analog network for carrying out this invention when the number of samples $N=3^m$, $m$ being an integer.

FIG. 4 shows structure for implementing the principles of this invention when $N=3^m m=2$. Thus, two sets of recursive operations on the nine input samples $X(00)$ through $X(22)$ are required to produce useful output information, such as either the amplitudes and phases of the harmonically related frequency components representing these samples or the discrete values of the Fourier series representation of these samples.

The numbers in the circles are the exponents to which $W=e^{-i2\pi}/9$ must be raised. Each node in row 1 combines amplitude and sometimes phase-modulated sinusoids representing three input samples. Each node in row 2 combines amplitude and sometimes phase-modulated data from three nodes in row 1 to produce the useful output information. The output signals produced at the nodes in row 2 represent the DC component, the fundamental frequency, and the next three harmonics of the samples being analyzed when the amplitudes and phases of the harmonically related frequency components of these samples are being determined. When the inverse discrete Fourier transform is being determined, the output signals at these nodes represent discrete values of the Fourier series representation of a selected time-dependent signal.

Other embodiments of this invention will be obvious to those skilled in signal processing in light of this disclosure. In particular, embodiments for calculating either the DFT or the IDFT of a selected set of $N$ samples where $$N=\prod_{q=0}^{m} r_q$$

and "$\Pi$" means "product," will be obvious to those skilled in signal processing.

I claim:

1. Apparatus which comprises:
means for modulating a complex sinusoid with $N$ sets of samples representative of a waveform, thereby producing an input set of $N$ modulated sinusoids,
$m$ processors $1,\ldots,M,\ldots,m$, where $M$ and $m$ are integers and $M$ equals $1<M<m$, each processor containing arrangements of conducting paths and combining nodes, with selected conducting paths including specified phase-shifting networks,
the first processor selectively combining the sinusoids in said input set of $N$ modulated sinusoids after phase-shifting selected ones, to produce a first set of processed sinusoids,
the $M^{th}$processor selectively combining the sinusoids in the $(M-1)$set of processed sinusoids after phase-shifting selected sinusoids in said $(M-1)^{th}$set, to produce an $M^{th}$set of processed sinusoids, and
the $m^{th}$processor selectively combining the sinusoids in the $(m-1)$set of processed sinusoids after phase-shifting selected sinusoids in said $(m-1)^{th}$set, to produce an output set of $N$ modulated sinusoids.

2. Apparatus as in claim 1 in which said means for modulating comprises:
means for storing said $N$ sets of samples, and
means for individually modulating said sinusoid with each sample of said $N$ sets of samples to produce said input set of $N$ modulated sinusoids.

3. Apparatus as in claim 1 in which said means for modulating comprises means for modulating the complex sinusoid with the amplitudes of said $N$ sets of samples of said waveform.

4. Apparatus as in claim 1 in which said means for modulating comprises means for modulating the complex sinusoid with the amplitude of the DC component and the amplitude and initial phases of selected harmonically related frequency components of said $N$ sets of samples representative of said waveform.

5. Apparatus as in claim 1 in which said means for storing includes means for storing complex samples possessing both amplitude and phase information, and in which said means for individually modulating said sinusoid with each of said samples includes means for both amplitude and phase modulating said sinusoid with each of said samples to produce said input set of $N$ modulated sinusoids.

6. Apparatus which comprises:
a source of a first complex sinusoid $e^{i\omega t}$where $\omega$ is a selected frequency,
means for storing $N$ complex samples, each sample in general containing both amplitude and phase information,
means for amplitude and phase modulating each of $N$ identical complex sinusoids derived from said first complex sinusoid with a corresponding one of said $N$ complex samples, to produce an input set of $N$ complex sinusoids, and
means for processing said input set of $N$ complex sinusoids to produce an output set of $N$ amplitude and phase modulated sinusoids representing a selected transformation of said $N$ complex samples.

7. Apparatus which comprises:
means for modulating each of $N$ samples with a corresponding one of $N$ identical sinusoids, where $N$ equals $r^m$both $r$ and $m$ being positive integers greater than unity, to produce an input set of $N$ modulated sinusoids,
$m$ means $1,\ldots,M,\ldots,m$, for processing said input set of $N$ modulated sinusoids, where $M$ and $m$ are integers, $M$ being given by $1\leq M\leq m$, to produce an output set of $N$ modulated sinusoids representing a selected transformation of said $N$ stored samples, the $M^{th}$of said $m$ means for processing comprising:
means for producing an $M^{th}$set of sinusoids, each sinusoid in said $M^{th}$set being produced by summing $r$ selected sinusoids from the $(M-1)^{th}$set of $N$ sinusoids, the $(M-1)$set of $N$ sinusoids being said input set of $N$ modulated sinusoids when $M$ equals 1, each sinusoid from said $(M-1)^{th}$set contributing to $r$ sinusoids in said $M^{th}$set, selected sinusoids from said $(M-1)^{th}$set being phase shifted by selected amounts prior to being combined in selected combinations, and said $M^{th}$set of $N$ sinusoids being said output set of $N$ modulated sinusoids when $M$ equals $m$.

8. Apparatus as in claim 7 in which $r$ equals 2.

9. Apparatus as in claim 8 in which $m$ equals 3.

10. Apparatus as in claim 7 in which $r$ equals 3.